United States Patent [19]

Helm et al.

[11] 4,136,591

[45] Jan. 30, 1979

[54] APPARATUS FOR CHANGING THE LENGTH OF ENVELOPE BLANKS CUT FROM A CONTINUOUS WEB

[75] Inventors: Herbert W. Helm; Dennis Ziegler, both of Hollidaysburg, Pa.

[73] Assignee: F. L. Smithe Machine Company, Inc., Duncansville, Pa.

[21] Appl. No.: 803,678

[22] Filed: Jun. 6, 1977

[51] Int. Cl.$^2$ .............................................. B31B 1/16
[52] U.S. Cl. ........................................ 83/355; 83/911; 93/63 R
[58] Field of Search ................. 83/312, 298, 301, 355, 83/357, 911; 93/63 R, 63 M, 61 R

[56] References Cited

U.S. PATENT DOCUMENTS

| | | | |
|---|---|---|---|
| 1,851,061 | 3/1932 | Poppe | 93/63 M X |
| 2,054,832 | 9/1936 | Potdevin | 93/63 M X |
| 3,128,662 | 4/1964 | Obenshain | 83/312 X |
| 4,020,722 | 5/1977 | Byrt et al. | 83/312 X |

Primary Examiner—James F. Coan

Attorney, Agent, or Firm—Stanely J. Price, Jr.; John M. Adams

[57] ABSTRACT

A drive shaft of the gumming and folding section of an envelope machine rotates at a preselected speed and is drivingly connected through meshing gears to the input shaft of a variable speed drive mechanism. The input shaft is connected to an output shaft through a differential transmission so that the output shaft is driven at a preselected ratio relative to the speed of the input shaft. The output shaft is drivingly connected to a web feeding apparatus that conveys a continuous web of material from a supply roll at a preselected speed. Thus, the web feeding apparatus is driven at a predetermined ratio relative to the speed of the drive shaft. A web cutting apparatus is drivingly connected to the input shaft so that a cut off knife is rotated at a fixed speed relative to the drive shaft to cut the continuous web at preselected intervals to form envelope blanks having a bottom flap connected to a closure flap. The variable speed drive mechanism is operable to change the speed of the output shaft relative to the input shaft to change the length of the envelope blank.

9 Claims, 4 Drawing Figures

APPARATUS FOR CHANGING THE LENGTH OF ENVELOPE BLANKS CUT FROM A CONTINUOUS WEB

BACKGROUND OF THE INVENTION

1. Field of the Invention

This invention relates to an envelope machine and more particularly to apparatus for changing the length of envelope blanks cut from a continuous roll of web material.

2. Description of the Prior Art

The throat of an envelope is formed by the closure flap fold and the edge of the bottom flap which is posiitoned in overlapping relation with the folded side flaps. The dimension of the throat, i.e., the distance between the closure fold and the edge of the bottom flap, must be a sufficient length to ensure that when the closure flap is folded, it overlaps the bottom flap so that the closure flap adhesive strip does not contact the inserted material. Accordingly, the envelope must be constructed with a throat dimension that is capable of accommodating the selected insert. Preferably, a change in the envelope throat dimension is accomplished by changing the length of the bottom flap while maintaining the closure flap and the envelope body portion fixed in length. To change the length of the bottom flap portion and thus the length of the envelope blank, it is necessary to change the linear speed of the endless web that is fed through the web cutting apparatus. The web cutting apparatus cuts the web material along a line that separates a bottom flap of one envelope blank from a closure flap of an adjacent envelope blank. To change the length of the bottom flap portion it is necessary to change the speed at which the pull rolls of the web feeding apparatus convey the continuous web from the supply roll. The side flaps of the envelope blank are formed by a rotatable cutter mechanism as disclosed in U.S. Pat. No. 3,782,233. The cutter blades of the rotatable cutter mechanism are rotated in phase with the moving web to cut notches at a preselected location on the web to form the side flaps and also define the side edges of the bottom and closure flaps. The length of the notches and accordingly the length of the bottom flap is varied by changing the phase relation between the cutter blades and the moving web.

The dimension of the throat of the envelope is determined by the length of the envelope blank and particularly by the amount the folded closure flap overlaps the bottom flap. Sufficient overlap must be provided to ensure that the strip of adhesive on the closure flap engages only the bottom flap and not the body portion between the closure flap fold and the edge of the bottom flap and a sufficient area of the bottom flap is engaged by the adhesive strip. This is to prevent the closure flap from adhering to the material inserted in the envelope. In order to effect a change in the dimension of the throat and, accordingly, the length of the bottom flap, the speed of rotation of the pull roll must be varied. The pull roll is drivingly connected through a gear train that connects the main drive shaft of the envelope machine or the drive shaft of one of the other components of the envelope machine, such as the envelope folder, to the pull rolls. A change in the speed of rotation of the pull rolls varies the amount the closure flap, when folded, overlaps the bottom flap. Preferably, a minimum overlap is provided to avoid excessive overlap and the accompanying expense of wasting paper with an excessive overlap.

The known method of changing the length of the envelope blank and accordingly the dimension of the envelope throat includes changing the size of gears of the gear train that drivingly connect the main drive shaft with the input to the pull roll shaft. The number of gears to be changed and the time required to remove and replace the gears is substantial. Replacement of the change gears provides for an incremental increase in the length of the bottom flap and consequently the amount of overlap between the closure flap and the bottom flap. The change intervals may vary, for example, from ¼ in. to 5/16 in. intervals. Consequently, even though a change in length of 1/16 in. or ⅛ in. is only required, the gear change provides a 5/16 in. increase resulting in an excess of 3/16 in. Such an increase for each envelope blank requires a substantial increase in the amount of the web material consumed to merely provide the extra 1/16 or ⅛ in. in the length of the bottom flap. In addition, for each incremental change in the length of the envelope blank, an additional set of change gears must be maintained, necessitating an increase in inventory expense and the expense of replacement parts.

There is need in an envelope machine for apparatus operable to change the length of envelope blanks cut from a continuous web to thereby change the length of the bottom flap and the dimension of the envelope throat. The change in length should be carried out without having to perform time consuming operations of removing and replacing the change gears that transmit drive from the main drive shaft to the web feeding apparatus. Also, the change in length should provide infinite cut off length possibilities, provide for easy change-over to preprinted webs and provide paper savings by minimizing the seal flap overlap.

SUMMARY OF THE INVENTION

In accordance with the present invention there is provided in an envelope machine, apparatus for changing the length of envelope blanks cut from a continuous roll of web material that includes a drive shaft of the envelope machine. The drive shaft is arranged to rotate at a preselected speed. Web feeding apparatus conveys web material from the supply roll at a preselected speed relative to the speed of the drive shaft. Web cutting apparatus cuts the web material at preselected intervals to cut a bottom flap, a closure flap, side flaps, and a body portion for each envelope blank. A variable speed drive mechanism has an input shaft and an output shaft. The input shaft is drivingly connected to the drive shaft so that the input shaft is driven at a predetermined ratio relative to the speed of the drive shaft. The output shaft is drivingly connected to the web feeding apparatus so that the web feeding apparatus is driven at a predetermined ratio relative to the speed of the drive shaft. The variable speed mechanism is operable to change the speed of the output shaft relative to the speed of the input shaft to change the length of the bottom flap while maintaining the closure flap and the body portion of the envelope a fixed length.

The web feeding apparatus includes a first pull roll that is nonrotatably mounted on a first pull roll shaft. The first pull roll shaft includes a gear nonrotatably mounted thereon. The gear is drivingly connected to the output shaft of the variable speed drive mechanism. The speed of rotation of the output shaft is controlled by the variable speed mechanism to, in turn, control or vary the speed of the pull roll shaft and consequently the speed of rotation of the first pull roll.

A pulley is nonrotatably mounted on the first pull roll shaft. The pulley is connected by an endless belt that is reeved about the pulley on the first pull roll shaft at one end and about another pulley that is nonrotatably mounted on a second pull roll shaft. The second pull roll shaft nonrotatably supports a second pull roll which is rotated at the speed of the first pull roll. The speed of the pull rolls is varied by controlling the speed of rotation of the output shaft. Pressure rolls maintain the web material in contact with the pull rolls so that rotation of the pull rolls at a preselected speed conveys the web material from the supply roll at a preselected linear speed. By adjusting the speed of rotation of the output shaft the linear speed of the web material is varied.

The web cutting apparatus includes a rotatable cutter shaft and a cutter mechanism nonrotatably secured to the cutter shaft. A gear is nonrotatably mounted on the rotatable cutter shaft and a plurality of meshing gears drivingly connect the rotatable cutter shaft to the input shaft. With this arrangement rotation is transmitted from the drive shaft through the rotatable cutter shaft to the meshing gears. Thus, the input shaft is rotated at a predetermined ratio relative to the drive shaft. The cutter shaft is driven at a fixed ratio relative to the drive shaft.

Upon each revolution of the cutter shaft, the cutter mechanism cuts the web material along the line separating the closure flap of one envelope blank from the bottom flap of an adjacent following envelope blank. Accordingly, a change in the speed of the continuous web relative to the fixed speed of rotation of the cutter shaft changes the length of the envelope blanks cut from the continuous web. Preferably, the length of the bottom flap is changed, and the closure flap and the body portion of the envelope are maintained a fixed length. In this manner, the space between the closure flap fold and the edge of the bottom flap is varied to form a throat of a preselected size for accommodating the particular size of material to be inserted within the folded envelope blank.

A side flap cutter mechanism is positioned on opposite sides of the web material and includes pairs of adjustable rotatable cutter blades that are operable to cut longitudinal notches in the envelope blank upon each revolution of the shaft supporting the cutter blades. The cutter blades form the side edges for the bottom flap and closure flap. The side flap cutter mechanism is drivingly connected to the drive shaft for rotation at a fixed ratio relative thereto.

A change in the speed of the continuous web to change the length of the bottom flap requires an adjustment to the phase relation between the side flap cutter blades and the continuous web moving below the cutter blades. With this arrangement a change in the length of the notch is effected to increase the length of the bottom flap while maintaining a preselected length of the closure flap and envelope body portion. By increasing the speed of the continuous web more material passes beneath the cutter mechanism of the web cutting apparatus for each revolution thereof. Thus the length of the envelope blank is increased when the length of the notch is increased to increase the length of the bottom flap.

For a change in the length of an envelope blank the speed of the output shaft is adjusted through a first differential transmission of the variable speed drive mechanism. Also, a second differential transmission is associated with the drive shaft and is operable to adjust the phase relationship between the web feeding apparatus and the web cutting apparatus. The second differential transmission provides for control of the cutting position of the web material relative to the web cutting apparatus independent of the speed of the output shaft. Thus, while the envelope machine is operating, the speed of the output shaft can be momentarily accelerated or decelerated to adjust the position of the web material relative to the web cutting apparatus so that the continuous web material is cut at a preselected location.

Accordingly, the principal object of the present invention is to provide in an envelope machine, apparatus for changing the length of envelope blanks cut from a continuous roll of web material while the machine is operating.

Another object of the present invention is to provide in an envelope machine, a variable speed drive mechanism that facilitates control of the speed of rotation of the shaft that drives the pull rolls of the web feeding apparatus to effect changes in the length of the envelope blanks to be formed.

An additional object of the present invention is to provide a variable speed drive mechanism associated with the web feeding apparatus for conveying web material from a roll and includes adjustment means for incremental increases in the length of the envelope blank while the machine is operating.

A further object of the present invention is to provide a web feeding apparatus for an envelope machine that is driven by a drive shaft of one of the components of the machine through a variable speed drive mechanism for adjusting the length of the envelope blank to be formed and more particularly adjusting the length of the bottom flap of the envelope blank to efficiently provide variations in the size of the throat of the envelope for accommodating material to be inserted in the folded envelope blank.

These and other objects of the present invention will be more completely described and disclosed in the following specification, the accompanying drawings, and the appended claims.

DESCRIPTION OF THE PREFERRED EMBODIMENT

Figure 2:
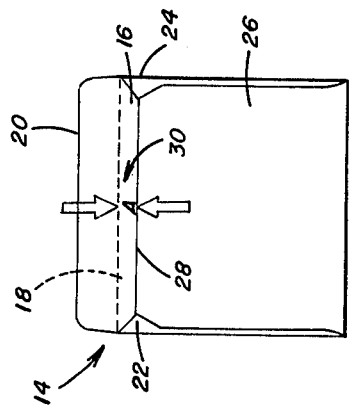
FIG. 2 is a plan view of a folded envelope blank, illustrating a throat portion having a dimension determined by the distance between the closure flap fold line and the edge of the bottom flap where the size of the throat is varied by the changing of the length of the bottom flap.
Figure 1:
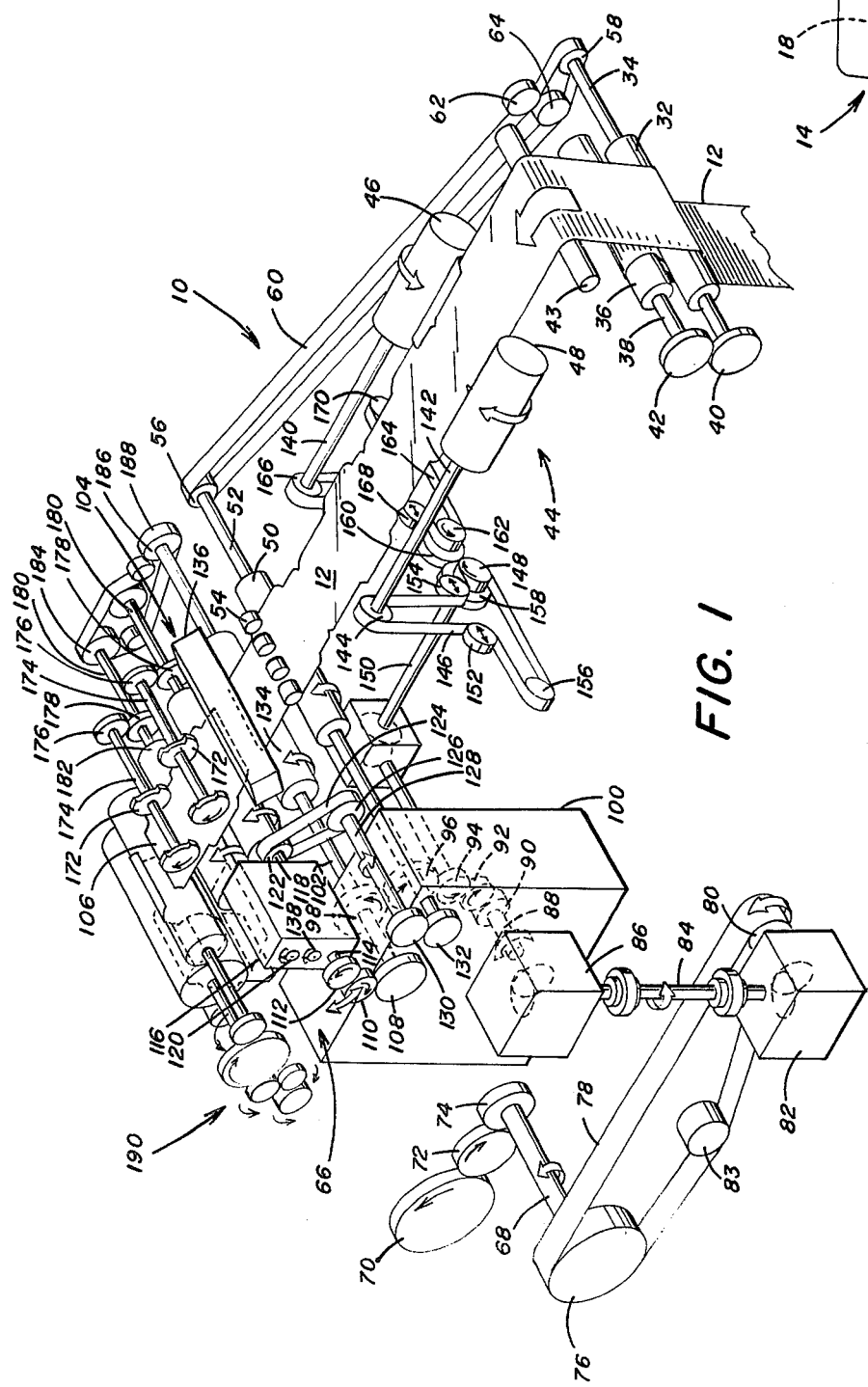
FIG. 1 is a perspective schematic view of a portion of an envelope making machine, illustrating apparatus for changing the length of envelope blanks cut from a continuous roll of web material.
Figure 4:
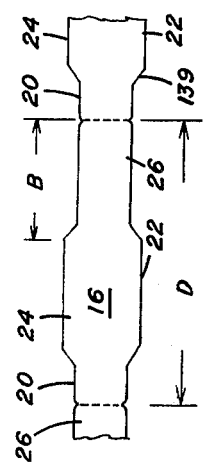
FIG. 4 is a view similar to FIG. 2, illustrating the continuous web having cut notches of a length greater than the length of the notches illustrated in FIG. 2 and a bottom flap of increased length.
Figure 3:
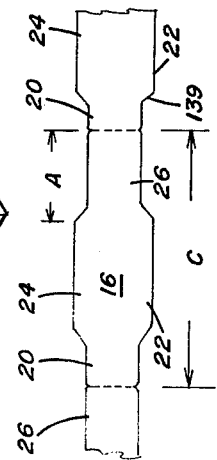
FIG. 3 is a schematic illustration of a continuous web, illustrating the continuous web having notches cut therein of a preselected length for forming a bottom flap of a preselected length.

Referring to the drawings and particularly to FIG. 1 there is illustrated a web cutting section 10 of an envelope machine positioned between an envelope blank gumming and folding section (not shown) and a supply reel or roll (not shown) of a continuous web of paper. The web cutting section 10, the envelope blank gumming and folding section, and supply roll are mounted in the frame of an envelope machine as is well known in the art. The continuous web is conveyed from the supply roll through the web cutting section 10 where the web is cut in the configuration as illustrated in FIGS. 3 and 4. The individual envelope blanks, having a preselected length, are conveyed from the web cutting section 10 to the adjacent envelope blank gumming and folding section. At the envelope blank gumming and folding section, adhesive material is applied to selected margins of the envelope blanks, and the envelope blanks are folded to form an envelope generally designated by the numeral 14, illustrated in FIG. 2.

The formed envelope 14 has a body portion 16 with a transverse closure flap score line 18 extending thereacross and forming a closure flap 20. The body portion has a pair of side flaps 22 and 24 adhesively secured to a bottom flap 26. The bottom flap 26 has a transverse edge 28. When the bottom flap 26 is folded, the transverse edge is spaced a preselected dimension, A, from the closure flap 20 to form a throat, generally designated by the numeral 30. In accordance with the present invention the size of the throat 30 may be varied by adjusting the length of the bottom flap 26 and, accordingly, the length of the envelope blank. The size of the throat 30 is selected to accommodate the material to be inserted within the envelope so that when the closure flap 20 is folded along score line 18 the adhesive strip that is applied to the edge of the closure flap 20 will not adhere to the insert within the envelope.

The continuous web 12 is fed at a preselected linear speed from the web supply roll by a first pull roll 32 that is nonrotatably supported by a pull roll shaft 34 that is driven at a preselected speed in accordance with the present invention. A tension roll 36 is nonrotatably mounted on a shaft 38 that is positioned parallel to the shaft 34 so that the tension roll 36 and the pull roll 32 are positioned in tangent relationship where the surface of the rolls frictionally engage the continuous web 12 so that rotation of the rolls advances the continuous web 12 at a preselected linear speed.

A gear 40 is nonrotatably secured to one end of the pull roll shaft 34 and is arranged in meshing relation with a gear 42 that is nonrotatably secured to the end of shaft 38. Thus, rotation of shaft 34 is transmitted by the gears 40 and 42 to the shaft 38 so that the tension roll 36 is driven at a speed corresponding to the speed of rotation of the pull roll shaft 34. The continuous web 12 extends vertically upwardly from the supply roll and around the tension roll 36, between the adjacent rolls 32 and 36, around the pull roll 32 and upwardly therefrom in a vertical direction. A change direction bar 43 is mounted in the envelope machine frame above the pull roll 34 to effect a change in the direction of travel of the continuous web 12 from a substantially vertical direction to a substantially horizontal direction.

The continuous web 12 passes through a rotatable cutter mechanism generally designated by the numeral 44 that is operable to cut notches in the side edge portions of the continuous web 12 to form the side edges of the bottom flap 26 and the closure flap 20. The rotatable cutter mechanism 44 includes a pair of adjustable rotatable cutters 46 and 48 which simultaneously cut notches in both edges of the continuous web. A suitable rotatable cutter mechanism is illustrated and described in United States Patent 3,782,233 and will be discussed hereinafter in greater detail. Each of the adjustable cutters 46 and 48 includes a pair of rotatable blades with one blade being angularly adjustable relative to the other blade. The relative radial angle between the blades controls the length of the notch cut in the side edges of the web.

The continuous web 12 is also conveyed at a preselected linear speed through the cutter mechanism 44 by a second pull roll 50 that is nonrotatably mounted on a driven shaft 52. Pressure rolls 54 are rotatably positioned above and tangent to the pull roll 50 so that the continuous web 12 is frictionally engaged by the pull roll 50 and the pressure rolls 54. The pull roll 50 and pressure rolls 54 are driven at a speed corresponding to the speed of rotation of pull roll 32. With this arrangement the continuous web 12 is conveyed from a supply roll through the rotatable cutter mechanism 44 at a preselected linear speed corresponding to the length of the envelope blanks to be cut from the continuous web 12.

A pulley 56 is nonrotatably connected to the end of the pull roll shaft 52, and in a similar arrangement, a pulley 58 is nonrotatably connected to the end of the pull roll shaft 34 that is adjacent to the end of the pull roll shaft 34. An endless belt 60 is reeved about the pulleys 56 and 58 so that rotation of the driven pull roll shaft 52 is transmitted by the endless belt 60 to the pull roll shaft 34 for rotating pull roll 32 at the speed of pull roll 50. Suitable rollers 62 and 64 maintain a preselected tension on the endless belt 60. With this arrangement, the continuous web 12 is advanced at a preselected linear speed through the web cutting section 10.

The pull roll shaft 52 is driven at a preselected speed by a variable speed drive mechanism generally designated by the numeral 66 that is connected through suitable gearing to a drive shaft 68 of one of the components of the envelope machine, such as the main drive shaft of the gumming and folding section (not shown) of the envelope machine. Meshing gears 70 and 72 transmit rotation of gear 74 that meshes with gear 72 and is nonrotatably secured to the drive shaft 68. A drive pulley 76 and endless belt 78 transmit rotation of drive shaft 68 to a pulley 80 mounted on a shaft (not shown) associated with a gear box 82. Takeup pulley 83 maintains a preselected tension on the endless belt 78.

Rotation of endless belt 78 is transmitted by pulley 80 and the shaft thereof to the gearing of gear box 82 which includes an output shaft 84 that is drivingly connected to suitable gearing of a second gear box 86. The output shaft 84 thus transmits rotation from the gear box 82 to the gear box 86. The gear box 86 also includes conventional gearing for transmitting rotation of shaft 84 to an output shaft 88. A gear 90 on output shaft 88 transmits rotation therefrom to a plurality of meshing gears 92, 94, 96 and 98 contained within a gear box 100. The gears 90-98 comprise an arrangement of meshing gears for transmitting rotation to a shaft 102 that drives a web cutting apparatus generally designated by numeral 104.

The web cutting apparatus 104, as will be described further in greater detail, is operable to cut the continuous web 12 along the line that separates the closure flap of one envelope blank from the bottom flap of the adjacent following envelope blank to form an envelope blank 106 cut from the continuous web 12. The envelope blank 106 has a preselected length to provide the desired dimension for the throat 30 of the folded envelope as illustrated in FIG. 2. With this arrangement the web cutting apparatus 104 is driven at a fixed ratio relative to the drive shaft 68 as determined by the gearing connecting the drive shaft 68 to the cutter shaft 102.

The cutter shaft 102 is driven at a fixed ratio relative to the drive shaft 68 and includes a change gear 108 that is drivingly connected through a movable gear 110 to a gear 112. The gear 112 is nonrotatably secured to an input shaft 114 of the variable speed drive mechanism 66. The meshing arrangement of the change gear 108, movable gear 110 and gear 112 constitutes the set of gears of the web cutting section 10 that determines the amount of overlap associated with the closure flap 20 and the bottom flap 26. These gears provide adjustment capability in cutting envelope blanks from the continuous web having a preselected length and particularly envelope blanks having a bottom flap of a preselected length. The change gear 108 is removable from the shaft 102 to permit a change in the size of the gear 108 with the movable gear 110 being adjustable to mesh with the replacement gear. Also, the entire set of gears 108, 110, and 112 may be changed to permit an adjustment in the length of the envelope blank cut from the continuous web. The size of the gears 108, 110, and 112 determines the speed ratio between the drive shaft 68 and the input shaft 114.

The variable speed drive mechanism 66 is suitably supported by the envelope machine frame and is preferably a P.I.V. gear type variable speed drive manufactured by Fairchild Industrial Products Division. A typical P.I.V. variable speed drive is illustrated and described in *Kent's Mechanical Engineers' Handbook*, Eleventh Edition, Section 24, beginning on page 72. A suitable P.I.V. variable speed drive includes pairs of conical discs mounted on shafts that serve as input and output shafts. The conical discs have radial teeth formed in their conical faces. The conical discs are arranged to move axially toward and away from each other on their respective shafts. An endless chain is reeved between the conical discs and has portions engaging the radial slots thereon. Movement of the pairs of discs toward and away from each other changes the speed ratio between the input and output shafts. Movement, for example, of the discs on the input shaft in one direction and corresponding movement of the discs on the output shaft in the opposite direction provides a change in the speed ratio between the input and output shafts. It should be understood that, although the P.I.V. variable speed drive is preferred, other types of variable speed drives, as for example, the Reeves Variable Speed Transmission or the Graham Variable Speed Transmission could also be used.

The P.I.V. variable speed drive 116 includes a first differential transmission that drivingly connects the input shaft 114 to an output shaft 118. The first differential transmission includes adjusting knob 120 and is operable upon rotation to increase or decrease the speed ratio between the input shaft 114 and the output shaft 118. Thus, for a given change gear 108, incremental adjustments can be made in the speed ratio between the input and output shafts as the pull rolls 32 and 50 are operating to convey the continuous web 12 from the supply roll. In this manner the speed of the web material through the web cutting section 10 is variable to permit a change in the length of the envelope blank cut from the continuous web. The change in the speed ratio between the input and output shafts 114 and 118 is therefore carried out by selective rotation of the adjusting knob 120 of the first differential transmission.

A pulley 122 is nonrotatably connected to the output shaft 118 and is connected by an endless belt 124 to a pulley 126 that is nonrotatably connected to a shaft 128. The shaft 128 is rotatably supported in the envelope machine frame and includes at its opposite end a gear 130 that is arranged in meshing relation with a gear 132 that is nonrotatably secured to the end of the pull roll shaft 52. With this arrangement the output shaft 118 of the P.I.V. variable speed drive 116 is drivingly connected to the pull roll shaft 52 for rotating the pull roll shaft at a predetermined ratio relative to the speed of the drive shaft 68. Accordingly, the speed of the pull roll shaft 52 is determined by the relative speed ratio between the input shaft 114 and the output shaft 118. The pull roll shaft 34 is also driven at the speed of the pull roll shaft 52 so that the pull rolls 32 and 50 are driven at the same preselected speed for conveying the continuous web 12 from the supply roll at a preselected linear speed.

As discussed hereinabove the cutter shaft 102 of the web cutting apparatus 104 is driven by the meshing gears of the gear box 100 at a fixed ratio relative to the drive shaft 68. A cutter mechanism 134 is nonrotatably secured to the cutter shaft 102 and includes a cut off knife 136. The cut off knife 136 is arranged upon each rotation of the cutter shaft 102 to cut an envelope blank 106 from the continuous web 12 along a line separating the closure flap of one envelope blank from the bottom flap of a second envelope blank adjacent to and following the first envelope blank. The rotatable cutter shaft 102 transmits rotation from the meshing gears of gear box 100 to change gear 108 and therefrom to the P.I.V. variable speed drive input shaft 114.

The P.I.V. variable speed drive 116 includes a second differential that is controlled by adjusting knob 138. The second differential transmission connects the input shaft 114 to the output shaft 118 to facilitate an adjustment in the phase relationship between the web feeding apparatus pull rolls 32 and 50 and the web cutting apparatus 104. Rotation of the adjusting knob 138 in a preselected direction serves to rotate the output shaft 118 through the second differential transmission to advance or retract the rotating pull roll shaft 52 through a portion of a revolution to advance or retract the pull rolls 50 and 32 through a corresponding portion of a revolution.

The adjustment to the rotating output shaft 118, independent of the transmission of rotation from the input shaft 114 to the output shaft 118 by the first differential mechanism, effects a change in the position of the cut off knife 136 relative to the continuous web 12 moving below the cut off knife. This permits control of the position or phase relationship between the cut off knife 136 and the continuous web 12 and the point where the cut off knife 136 cuts the continuous web 12. Therefore if, due to shrinkage of the continuous web 12, the cut off knife 136 should deviate from the position where it is to cut the continuous web, the continuous web may be returned to the proper phase relation with the cut off knife 136 by operation of the adjusting knob 138 and the second differential transmission of unit 116. This ensures that the cut off knife 136 cuts the continuous web at the same position to provide for envelope blanks having a preselected configuration.

As illustrated in FIGS. 3 and 4 a change in the speed of the continuous web 12 through the web cutting section 10 is effective to change the length of the individual envelope blanks cut from the continuous web 12. For example, in FIG. 3, for an envelope blank having a length, C, an increase in the speed of the web material 12 increases the length of the envelope blank that is cut from the continuous web. The portion of the envelope blank that is increased in length is the bottom flap 26, shown to have a length, A, in FIG. 3. The length of the closure flap 20 and the body portion 16 remains the same. An increase in the length of the envelope blank, from length C to length D, takes place in extending the length of the bottom flap from the length A to a length B. The body portion 16 and the closure flap 20 remain the same length. Thus, in accordance with the practice of the present invention a change in length of the blank from C to D is effected by changing the speed ratio between the input shaft 114 and the output shaft 118 by the P.I.V. variable speed gear drive.

A change in the length of the envelope blank by changing the length of the bottom flap requires an adjustment to the length of the notch 139 made in the web by the rotatable cutter mechanism 44. A change in the web speed requires a change in the relative rotation of the rotatable blades of the adjustable cutters 46 and 48 with respect to the continuous web passing beneath the cutters. By rotating one cutter blade relative to the other on the shaft supporting the blades the timing sequence of the cutting operation of the blades is controlled to permit a greater or lesser portion of the moving web to pass beneath the blades to increase or decrease the length of the bottom flap.

The side flap cutters 46 and 48 are drivingly connected to the drive shaft 68 for rotation at a fixed speed relative to the speed of the drive shaft 68. The side flap cutters 46 and 48 are nonrotatably secured to cutter shafts 140 and 142. Preferably, each of the side flap cutters 46 and 48 includes a pair of rotatable cutter blades as illustrated and described in U.S. Pat. No. 3,782,233 where one blade is adjustable angularly relative to the other. The cutter shaft 142 includes a pulley 144 that is drivingly connected by an endless belt 146 that is reeved about a pulley 148 on a driven shaft 150. Takeup pulleys 152, 154 and 156 maintain a preselected tension on the endless belt 146 to prevent it from slipping on the pulleys 144 and 148. Thus, rotation of the driven shaft 150 is transmitted by the endless belt 146 to the cutter shaft 142.

The driven shaft 150 includes a gear 158 nonrotatably secured thereto and arranged in meshing relation with a gear 160 that is nonrotatably secured to a shaft (not shown) that rotates a pulley 162. An endless belt 164 is reeved about a pulley 166 that is nonrotatably secured to the cutter shaft 140 of the side flap cutter 46. Takeup pulleys 168 and 170 exert a preselected tension on the endless belt 164. Thus, rotation of the driven shaft 150 is transmitted to the cutter shaft 140 so that the side flap cutter 46 is rotated at a speed corresponding to the speed of rotation of the side flap cutter 48.

With a pair of rotatable cutter blades for each side flap cutter 46 and 48, one of the cutter blades is adjustable angularly relative to the other so that the blades may be radially displaced from one another on the respective cutter shaft. This permits a change in the length of the notch 139 cut in the side edge of the continuous web. A change in the radial position of the blades relative to one another permits a greater or lesser portion of the moving continuous web to pass beneath the blades to increase or decrease the length of the bottom flap 26 as determined by the speed of the continuous web through the web cutting section 10.

Thus, as illustrated in FIGS. 3 and 4, the length of the notch 139 can be increased to increase the length of the bottom flap 26 from a length A to a length B. The increase in the length of the notch is accompanied by an increase in the speed of the web by rotating the knob 120 of the variable speed drive mechanism 116. An increase in the speed of the continuous web increases the length of the envelope blank cut from the web so that the body portion 16 and the closure flap 20 remain the same length. The amount the bottom flap 26 overlaps the folded side flaps 22 and 24 is increased with an increase in the length of the bottom flap. This, in turn, decreases the dimension of the throat 30 of the folded envelope 14, as illustrated in FIG. 2.

The conversion in the length of the bottom flap from length A to length B provides for an incremental decrease in dimension of the throat 30 and is accomplished by adjusting the speed ratio between the input shaft 114 and the output shaft 118 by rotating the knob 120 of the P.I.V. variable speed drive 116. This effects a web speed change without requiring a change in the gears 108-112. Furthermore, the selected speed change does not result in excessive overlap of the folded closure flap 20 on the bottom 26. The benefit thereby gained is a savings in paper. Previously, a gear change necessitated by a web speed change resulted in excessive overlap of the folded closure flap. However, with the present invention the P.I.V. variable speed drive 116 provides for precise selection of the length of the envelope blank to be cut from the web for a preselected throat dimension without excessive overlap of the closure flap 20 when folded over the bottom flap 26.

The continuous web 12 with notches cut in the side edges of the web passes through the pull roll 50 and pressure rollers 54 beneath the web cutting apparatus 104. The cut off knife 136 severs an envelope blank 106 from the continuous web along a score line spearating the bottom flap and closure flap of adjacent envelope blanks. The cut envelope blank 106 is conveyed by a plurality of hold down rolls 172 that are nonrotatably supported by shafts 174 that include gears 176 arranged in meshing relation with gears 178 of shafts 180. Driven pressure rolls 182 are nonrotatably secured to the shafts 180 and cooperate with pressure rolls 172 to frictionally engage the cut envelope blank 106 and convey the envelope blank away from the web cutting apparatus 104.

The shafts 180 include pulleys 184 which are rotated at the speed of rotation of the cutter shaft 102. The cutter shaft 102 includes a pulley 186 and an endless belt 188 that is reeved around the pulley 186 and the pulley 184. With this arrangement, the pressure rolls 172 and 182 are rotated by the drive shaft 68 through the driven cutter shaft 102. Thereafter, the envelope blank 106 is conveyed from the web cutting section 10 by a feeder section generally designated by the numeral 190 of the envelope machine to the envelope gumming and folding section that is positioned adjacent the web cutting section 10.

It should be understood the previously described apparatus may also be utilized to vary one dimension of a diamond shaped envelope blank. For example, where a web of a given width is cut to form a diamond shaped envelope blank by cutting the web along a diagonal, the length of the blank between cuts may be changed by the previously described apparatus. This permits a rapid change-over from webs of different width to provide diamond shaped envelope blanks of different size.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. In an envelope machine, apparatus for changing the length of envelope blanks cut from a continuous roll of web material comprising,
   a drive shaft of the envelope machine,
   said drive shaft arranged to rotate at a preselected speed,
   web feeding apparatus for conveying web material at a preselected speed relative to the speed of said drive shaft,
   web cutting apparatus for cutting the web material at preselected intervals to form envelope blanks therefrom,
   a variable speed drive mechanism having an input shaft and an output shaft,
   a plurality of meshing change speed gears connecting said drive shaft to said input shaft,
   said input shaft being drivingly connected to said drive shaft through said meshing change speed gears so that said input shaft is driven at a preselected ratio relative to the speed of said drive shaft,
   said output shaft being drivingly connected to said web feeding apparatus so that said web feeding apparatus is driven at a predetermined ratio relative to the speed of said drive shaft,
   means to change the ratio of said meshing change speed gears and change the speed ratio at which said input shaft is driven relative to said drive shaft and change the length of the envelope blank, and
   said variable speed mechanism being operable to change the speed of said output shaft relative to the speed of said input shaft to further change the length of the envelope blank and change the length of the throat section of the envelope.

2. In an envelope machine, apparatus as set forth in claim 1 which includes,
   said web cutting apparatus being drivingly connected to said drive shaft so that said web cutting apparatus is driven at a fixed ratio to the speed of said drive shaft.

3. In an envelope machine, apparatus as set forth in claim 1 in which,
   said web cutting apparatus forms envelope blanks having a bottom flap, a closure flap, side flaps and a body portion,
   side flap cutter means drivingly connected to said drive shaft for cutting the web material to form the side edges of the bottom flap and closure flap of each envelope blank cut from the web material, and
   said side flap cutter means being driven at a fixed speed relative to the speed of said drive shaft.

4. In an envelope machine, apparatus as set forth in claim 1 in which said web feeding apparatus includes,
   a pull roll shaft drivingly connected to said web feeding apparatus,
   a pull roll nonrotatably mounted on said pull roll shaft, and
   said pull roll arranged to frictionally engage the web material and pull the material at a preselected linear speed.

5. In an envelope machine, apparatus as set forth in claim 4 which includes,
   a second pull roll shaft spaced from said first mentioned pull roll shaft,
   a second pull roll nonrotatably mounted on said second pull roll shaft,
   drive means for drivingly connecting said first mentioned pull roll with said second pull roll for rotation thereof at a preselected speed relative to said first mentioned pull roll, and
   said second pull roll arranged to frictionally engage the web material and pull the web material at the linear speed generated by said first mentioned pull roll.

6. In an envelope machine, apparatus as set forth in claim 1 which includes,
   a first gear nonrotatably mounted on said drive shaft,
   a second gear nonrotatably mounted on said input shaft,
   drive transfer means positioned between said drive shaft and said input shaft for transmitting drive from said drive shaft to said input shaft, and
   said drive transfer means including a gear train having a plurality of preselected gears arranged in meshing relation with each other and drivingly connected to said first gear and said second gear for transmitting rotation of said drive shaft at a preselected ratio to said input shaft.

7. In an envelope machine, apparatus as set forth in claim 3 which includes,
   said web cutting apparatus having a rotatable cutter shaft,
   a cutter mechanism nonrotatably secured to said cutter shaft,
   said cutter mechanism being operable upon each rotation of said cutter shaft to cut the web material along a line separating the closure flap of a first envelope blank from the bottom flap of a second envelope blank following the first envelope blank,
   said web feeding apparatus having a rotatable pull roll shaft and a pull roll nonrotatably mounted on said pull roll shaft,
   a first gear nonrotatably mounted on said rotatable cutter shaft,
   a gear train having a plurality of preselected gears arranged in meshing relation for transmitting rotation from said first shaft to said first gear,
   a change gear drivingly connecting said rotatable cutter shaft to said input shaft to thereby transmit drive from said drive shaft through said rotatable cutter shaft and said change gear to said input shaft, and
   drive means for drivingly connecting said output shaft to said pull roll shaft so that said pull roll shaft is driven at a fixed ratio to the speed of said output shaft.

8. In an envelope machine, apparatus as set forth in claim 1 which includes,
   said variable speed drive mechanism having a first differential transmission connecting said input shaft to the output shaft of said differential transmission, and said first differential transmission being operable to change the ratio of the speed of said web feeding apparatus to said web cutting apparatus and thereby change the length of the bottom flap to vary the dimension between the closure flap fold and the edge of the bottom flap.

9. In an envelope machine, apparatus as set forth in claim 8 which includes,
   said variable speed drive mechanism having a second differential transmission connecting said input shaft to said output shaft,
   said second differential transmission being operable to adjust the phase relationship between said web feeding apparatus and said web cutting apparatus to thereby control the cutting position of the web cutting apparatus relative to the web material.

* * * * *